April 22, 1952     R. B. MENTZER     2,593,687
WORK HOLDER ORIENTING DEVICE
Filed June 28, 1949
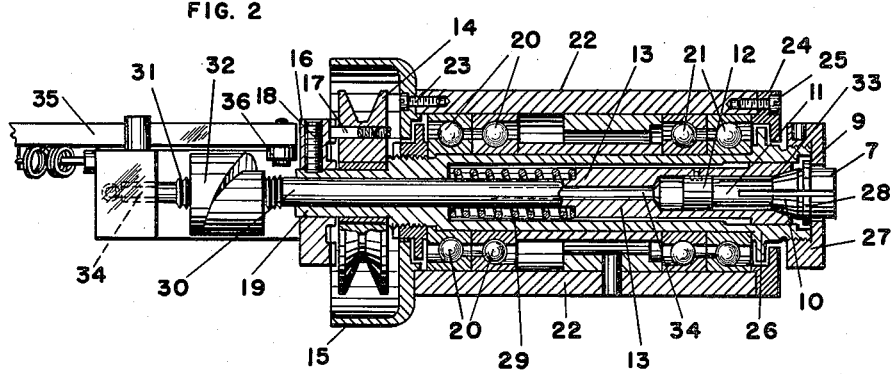
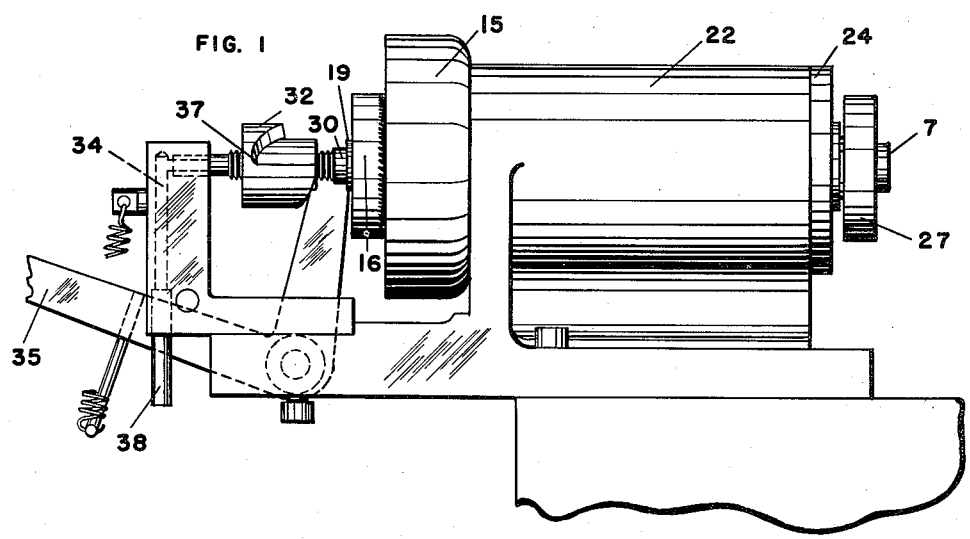
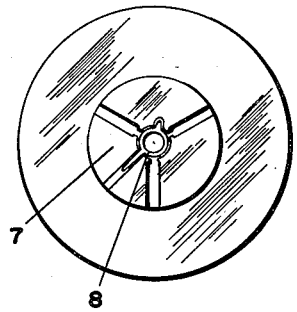
Inventor
RALPH BENDER MENTZER
ATTORNEY Patented Apr. 22, 1952

2,593,687

UNITED STATES PATENT OFFICE 2,593,687

WORK HOLDER ORIENTING DEVICE

Ralph B. Mentzer, Lancaster, Pa., assignor to Hamilton Watch Company, Lancaster, Pa.

Application June 28, 1949, Serial No. 101,887

1 Claim. (Cl. 279—53)

This invention relates to an attachment for a chuck which will simultaneously open and orient the chuck.

In the manufacture of small parts which are loaded into a chuck by hand it is advantageous, particularly where the small parts are irregular, to orient the chuck so that the parts are loaded with the chuck in exactly the same position. To also conserve time the operation of opening the chuck is coupled with that of orienting the chuck so that the operator does both at a single operation and simultaneously.

The object of the present invention is to provide mechanism so that with a single operation an operator may open and orient a chuck.

It is a further object of the present invention to provide a cam adapted to be engaged by a manually operated lever to simultaneously angularly position the chuck and open said chuck for both discharge of the finished piece and reception of a piece to be worked upon.

It is a further object of the invention to provide a ratchet driving mechanism so that it is not necessary for the operator in orienting the chuck to turn the entire driving mechanism.

It is a still further object of the invention to use a special built chuck which fits the workpiece and to provide a combination of mechanisms which will simultaneously orient the chuck, release the chuck's gripping jaws and open a valve to discharge a current of air to remove the workpiece from the chuck.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawing in which:

Figure 1 is a side elevation.

Figure 2 is a top plan partly in section.

Figure 3 is a detail end view of the chuck.

The attachment for the chuck is used where a special chuck 7 is designed to hold a workpiece 8 which must be positioned in the chuck in a definite manner. The workpiece is then put through a taper boring operation which is not shown here and which has no bearing on the invention. It is advantageous if the worker who positions the pieces by hand may have the chuck in exactly the same position to receive the workpiece each time.

The chuck 7 is provided with a collar 9, a tapered portion 10 and a cylindrical portion 11. The cylindrical portion is provided with a keyway 12 to prevent rotation of the chuck relative to the sleeve 13.

A driven pulley 14 partly surrounded by shield 15 engages a ratchet wheel 16 through a spring loaded pawl 17. The ratchet wheel is secured to a sleeve 19 by a screw 18 and rotates the sleeve 19 in the bearings 20 and 21. An outer casing 22 supports the shield 15 at one end by screws 23 while the other end supports a cap 24 held by screws 25 which maintain the assembly in position. An annular collar 26 integral with the sleeve 19 provides bearing 21 with a dust seat and restricts longitudinal motion of the sleeve 19. A cap 27 is threaded on the end of the sleeve 19 and engages an annular ring 28 of the collet to provide a friction drive for said collet. The spring 29 bearing against the sleeve 13 insures sufficient frictional contact between the ring 28 and the cap 27 to produce the desired drive.

The sleeve 13 is hollow and is provided with a hollow cylindrical extension 30 which is threaded at 31 to receive the cam 32. Longitudinal movement of the sleeve 13 against the action of the spring 29 releases the ring 28 from contact with the cap 27 and at the same time removes the pressure between the conical surface 10 of the collet end 33 of the sleeve 13 to allow the collet to spring open at which time a blast of air delivered through the hollow section 34 of the sleeve 13 removes the workpiece 8 from the collet.

Simultaneously with the longitudinal movement of the sleeve 13 which is accomplished through the lever 35 and the cam engaging roller 36, the sleeve 13 and its accompanying collet 7 is rotated to locate the position of the workpiece.

In use, supposing that the taper boring operation has been completed, the lever 35 is manually operated to bring the roller 36 into engagement with the cam 32. Further movement of the lever is resisted by the spring 29 so that the pressure of the roller 36 rotates the cam 32 to orient the chuck to the proper loading position. Continued movement of the lever 35 causes the roller 36 which has engaged the notch 37 of the cam 32 to move the entire cam assembly longitudinally releasing the tapered surface 33 from contact with the cooperating tapered surface of the chuck. This releases the workpiece from the gripping jaws of the chuck and simultaneously an air valve in the line 38 (said air valve not shown) is opened to allow a blast of air to pass through the line 38 and eject the workpiece. This entire operation is accomplished by a single quick movement of the lever 35 so that the operator upon the completion of the boring operation slaps the lever 35 and inserts a new workpiece in a single smooth operation.

What is claimed is:

In a specialized boring lathe, a special chuck adapted to receive a workpiece at a definite angular position, an overrunning clutch type ratchet driving mechanism, a cylindrical rod connected to said ratchet driving mechanism, a second cylindrical rod housed within said first cylindrical rod, a chuck housed within and opened and closed by said second cylindrical rod, means bearing against said second cylindrical rod and forcing said chuck into workpiece holding position and driving contact with said first cylindrical rod, a hollow extension on said second cylindrical rod extending beyond said ratchet driving means, a cam on said extension, a manually operated lever for engaging said cam to simultaneously orient said chuck to loading position and to release said chuck from said second cylindrical rod holding means for release of said finished workpiece and proper positioning for the reception of said second workpiece.

RALPH BENDER MENTZER.

REFERENCES CITED

The following references are of record in the file of this patent:

UNITED STATES PATENTS

| Number | Name | Date |
|---|---|---|
| 518,803 | Bohn | Apr. 24, 1894 |
| 522,930 | Church | July 10, 1894 |
| 640,029 | Richards | Dec. 26, 1899 |
| 926,761 | Oliver | July 6, 1909 |
| 1,411,082 | Gotsdanker | Mar. 28, 1922 |
| 1,535,048 | Schumer | Apr. 21, 1925 |
| 1,801,602 | Hunziker | Apr. 21, 1931 |
| 2,374,769 | Musante | May 1, 1945 |
| 2,480,715 | De Graff | Aug. 30, 1949 |
| 2,502,260 | Hunziker | Mar. 28, 1950 |